(12) United States Patent
Huang et al.

(10) Patent No.: US 9,229,569 B2
(45) Date of Patent: Jan. 5, 2016

(54) SAFETY PROTECTION METHOD AND DEVICE OF ELECTRONIC DEVICE TOUCH SCREEN

(75) Inventors: Shanbing Huang, Guangdong (CN); Qiming Liu, Guangdong (CN)

(73) Assignee: SHENZHEN XINGUODU TECHNOLOGY CO., LTD., Shenzhen (CN)

( * ) Notice: Subject to any disclaimer, the term of this patent is extended or adjusted under 35 U.S.C. 154(b) by 370 days.

(21) Appl. No.: 13/883,285

(22) PCT Filed: Aug. 31, 2012

(86) PCT No.: PCT/CN2012/080889
§ 371 (c)(1),
(2), (4) Date: May 3, 2013

(87) PCT Pub. No.: WO2013/060196
PCT Pub. Date: May 2, 2013

(65) Prior Publication Data
US 2013/0222320 A1  Aug. 29, 2013

(30) Foreign Application Priority Data

Oct. 28, 2011  (CN) .......................... 2011 1 0333397

(51) Int. Cl.
| | | |
|---|---|---|
| *G06F 21/83* | (2013.01) | |
| *G06F 3/041* | (2006.01) | |
| *G06F 21/71* | (2013.01) | |
| *G06F 21/74* | (2013.01) | |

(52) U.S. Cl.
CPC .............. *G06F 3/0416* (2013.01); *G06F 21/71* (2013.01); *G06F 21/74* (2013.01); *G06F 2221/2101* (2013.01); *G06F 2221/2105* (2013.01); *G06F 2221/2143* (2013.01)

(58) Field of Classification Search
CPC ... G06F 3/0416; G06F 3/0418; G06F 3/0412; G06F 21/30; G06F 13/10; G06F 21/44; G06F 21/45; G06F 21/60; G06F 21/604; G06F 21/62; G06F 21/6245; G06F 21/70; G06F 21/71; G06F 21/73; G06F 21/74; G06F 21/81; G06F 21/82; G06F 21/83; G06F 21/86; G06F 2221/2143; G06F 2221/2101; G06F 2221/2105
USPC .......................................................... 345/173
See application file for complete search history.

(56) References Cited

U.S. PATENT DOCUMENTS

| | | | | |
|---|---|---|---|---|
| 8,085,250 B2 * | 12/2011 | Reynolds | ............. | H03K 17/962 178/18.01 |
| 8,310,351 B2 * | 11/2012 | Krahenbuhl | .......... | G06F 1/1626 340/407.2 |

(Continued)

FOREIGN PATENT DOCUMENTS

CN   102509052 A   6/2012

OTHER PUBLICATIONS

International Search Report of the PCT Application No. PCT/CN2012/080889.

*Primary Examiner* — Aneeta Yodichkas
*Assistant Examiner* — Chineyere Wills-Burns

(57) ABSTRACT

The present invention discloses a safety protection device of an electronic device touch screen including a detection module, a control processing module and a self-destroying/alarming execution module, wherein the detection module is used for applying excitation signals on an electrical pin of the touch screen and detecting corresponding electrical characteristic value to serve as characteristic information, and the control processing module is used for receiving the characteristic information and judging whether the characteristic information is in consistency with prestored standard characteristic information, controlling normal working of the electronic device if the result of judgment is yes and controlling the electronic device to stop working and enabling the self-destroying/alarming execution module to carry out actions of self information destroying/alarming transmission if not. The device of the present invention can greatly improve safety performance of electronic device. Simultaneously, the present invention provides a corresponding safety protection method.

9 Claims, 5 Drawing Sheets

(56) References Cited

U.S. PATENT DOCUMENTS

| | | | |
|---|---|---|---|
| 8,427,328 B1 * | 4/2013 | Leblang | G08B 13/1418 340/635 |
| 8,441,455 B2 * | 5/2013 | Chang | G06F 1/1626 345/173 |
| 8,595,514 B2 * | 11/2013 | Mirkazemi-Moud | G06F 1/1626 340/539.1 |
| 2011/0215938 A1 * | 9/2011 | Neo | G08B 21/185 340/635 |

* cited by examiner

SAFETY PROTECTION METHOD AND DEVICE OF ELECTRONIC DEVICE TOUCH SCREEN

FIELD OF THE INVENTION

The present invention relates to the technical field of financial communication, and more particularly to a safety protection device of an electronic device touch screen able to be used for detecting whether the touch screen of the electronic device has been refitted illegally to threat the sensitive information security of user, and a corresponding safety protection method.

BACKGROUND OF THE INVENTION

With the promotion and application of information technology, in our life and work, more and more electronic ways for currency settlement have been adopted. The electronic currency settlement way not only has advantages of convenience and speed, but also can reduce the cash pressure of the central bank. At present, the electronic settlement way has been applied to the settlement of various industries such as shopping in the department store and high-end consumption in exclusive shop, also applied to some entertainment venues such as karaoke parlors, bars, theatres and so on, and further applied to some special industries, such as gas stations, stops, toll stations, parks and so on.

Wherein, POS (Point Of Sale) machines as terminal equipments of electronic charging system are the electronic devices with which the consumers contact most often in the daily consumption by swiping card, and during its use, the confidentiality of sensitive information like password of the users is the most concern of users. A general POS machine includes a host machine, a touch screen and a password keyboard. Usually, the keyboard has a encryption processing unit disposed therein to make an encryption protection for the password inputted by the user, but the touch screen do not provide a function of inputting password and do not have an encryption processing unit, thus, the user can use only the password keyboards to implement an operation of inputting password. However, the above-mentioned POS machine exists following potential security problems: because the touch screen has no encryption function for the information inputted, some criminals much more likely change the touch screen of the POS machine to mislead the user to input password by using the touch screen, thereby embezzling the password of the user easily. Except the above-mentioned POS machines, other electronic devices such as ATM machines, safes and so on also exist above-mentioned potential security problems.

Thus, it is necessary to provide a safety protection device and a corresponding safety protection method of an electronic device touch screen, which is able to be used for detecting whether the touch screen of the above-mentioned electronic device has been refitted illegally to threat the sensitive information security of user, thereby solving above defects.

SUMMARY OF THE INVENTION

One object of the present invention is to provide a safety protection device of an electronic device touch screen, which is able to detect whether the touch screen of the electronic device has been refitted illegally to threat the sensitive information security of user.

Another object of the present invention is to provide a safety protection method of an electronic device touch screen, which is able to detect whether the touch screen of the electronic device has been refitted illegally to threat the sensitive information security of user.

To achieve above objects, the safety protection device of electronic device touch screen provided by the present invention includes a detection module, a control processing module and a self-destroying/alarming execution module, the detection module is used for applying excitation signals on one or one set of electrical pins of the touch screen and detecting one or one set of corresponding electrical characteristic value from the one or one set of electrical pins, the one or one set of electrical characteristic values serving as characteristic information capable of identifying the touch screen uniquely, and the control processing module is used for receiving the characteristic information and judging whether the characteristic information is in consistency with prestored standard characteristic information, controlling the electronic device to work normally if the characteristic information is in consistency with prestored standard characteristic information and controlling the electronic device to stop working and sending trigger signals to the self-destroying/alarming execution module to enable the self-destroying/alarming execution module to carry out actions of self information destroying/ alarming transmission if the characteristic information is not in consistency with prestored standard characteristic information.

In a preferred embodiment of the present invention, the control processing module includes a standard ID storage unit, a control unit, a characteristic information processing unit, an ID judging unit and a protection mechanism processing unit; the standard ID storage unit is used for storing the standard characteristic information which is composed of initial characteristic information of the touch screen and capable of identifying the touch screen uniquely, the control unit is used for controlling the electronic device to work normally or stop working, the characteristic information processing unit is used for carrying out an eliminating shake and filtering processing for the read initial characteristic information so as to extract actual characteristic information of the touch screen, the ID judging unit is used for comparing the characteristic information with the standard characteristic information stored in the ID storage unit, and the protection mechanism processing unit is used for sending trigger signals to the self-destroying/alarming execution module.

Preferably, the touch screen is resistance-type touch screen, capacitive touch screen, infrared touch screen, sound wave identification type touch screen or electromagnetic induction type touch screen; and the characteristic information includes absolute value or relative value of one or more parameters of resistance value, capacitance value, inductance value of the touch screen.

Preferably, the safety protection device of electronic device touch screen further includes an anti-removing mechanism, the anti-removing mechanism includes at least one micro-touch switch connected to the touch screen, and the micro-touch switch is metal dome micro-touch switch, conductive carbon particle micro-touch switch or conductive adhesive micro-touch switch. Wherein, the metal conductive dome micro-touch switch includes a metal ball electrically connected to the touch screen and two metal domes electrically connected to the detection module, and the metal ball is arranged between the two metal domes and separably connected to the metal domes. In another embodiment, the metal conductive dome micro-touch switch includes a metal dome electrically connected to the touch screen and conductive goldfingers electrically connected to the detection module, and the metal dome is separably connected to the conductive goldfingers.

In another embodiment, the anti-removing mechanism includes at least one photoelectric detecting switch, and the photoelectric detecting switch includes a mirror plane fixed on the touch screen, a light emitting diode and an optical coupling diode, both of which are electrically connected to the detection module.

Preferably, the electronic device, to which the safety protection device applies, includes POS machine, ATM machine or safe.

To achieve above objects, the safety protection method of electronic device touch screen provided by the present invention includes the following steps: adopting a detection module to apply excitation signals on one or one set of electrical pins of the touch screen and detect one or one set of corresponding electrical characteristic value from the one or one set of electrical pins, the one or one set of electrical characteristic value serving as characteristic information (ID) capable of identifying the touch screen uniquely; adopting a control processing module to receive the characteristic information and judge whether the characteristic information is in consistency with prestored standard characteristic information; controlling the electronic device to work normally if the characteristic information is in consistency with prestored standard characteristic information and controlling the electronic device to stop working and sending trigger signals to the self-destroying/alarming execution module to enable the self-destroying/alarming execution module to carry out actions of self information destroying/alarming transmission if the characteristic information is not in consistency with prestored standard characteristic information.

Compared with the prior art, the safety protection device of electronic device touch screen of the present invention can detect whether the touch screen of the electronic device has been refitted illegally to threat the sensitive information security of user. This safety protection device of electronic device touch screen utilizes own properties of the electronic device touch screen to judge whether the touch screen has been refitted or replaced, by means of detecting the characteristic information of the touch screen in real time and comparing it with the standard characteristic information of factory setting; if the detected characteristic information is in consistency with prestored standard characteristic information, it means that the touch screen is still the touch screen of factory setting, belongs to normal use range, then the electronic device will be controlled to work normally; if the detected characteristic information is not in consistency with prestored standard characteristic information, it means that the original property of the touch screen has been changed, that is, the touch screen has been refitted or replaced illegally, then the electronic device will be controlled to stop working and produce actions of self information destroying/alarming transmission. As described above, the safety protection device of electronic device touch screen of the present invention, because of being able to detect whether the touch screen of the electronic device has been refitted illegally, can be applied to various electronic devices, which need a safety protection function for sensitive information like password and have a touch screen, to ensure their safety performance.

The present invention will become more clear by means of the following description combining the accompanying drawings, which are used to illustrate embodiments of the present invention.

DESCRIPTION OF THE LABELS IN THE FIGURES

Figure 1:
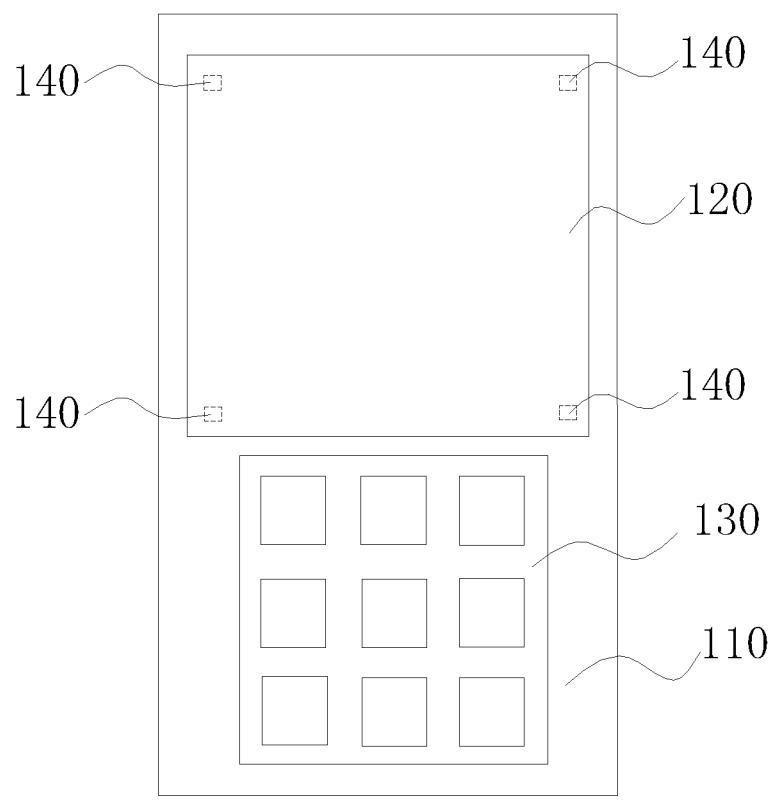
FIG. 1 shows a POS machine using a safety protection device of an electronic device touch screen of the present invention.

Electronic device 100; host machine 110; detection module 111; control processing module 112; control unit 112a; standard ID storage unit 112b; characteristic information processing unit 112c; ID judging unit 112d; protection mechanism processing unit 112e; self-destroying/alarming execution unit 113; touch screen 120; password keyboard 130; metal conductive dome micro-touch switch 140, 150; metal ball 141; metal dome 142, 151; conductive goldfinger 152; photoelectric detecting switch 160; mirror plane 161; light emitting diode 162; optical coupling diode 163.

DETAILED DESCRIPTION OF ILLUSTRATED EMBODIMENTS

The technical solutions of embodiments will be clear and completely described as follows by combining the figures of the embodiments of the present invention, and similar labels in the figures represent similar components. Obviously, the embodiments described as follows are merely parts of embodiments of the present invention, but not the all. Based on the embodiments of the present invention, other embodiments created by one of ordinary skill in the art without creative work, all belong to the scope of the present invention.

Firstly, please referring to FIG. 1, in this embodiment, the electronic device 100 to which the safety protection device of electronic device touch screen applies is a POS machine, the POS machine includes a host machine 110, a touch screen 120 and a password keyboard 130, both of which are mounted on the host machine 110, and the safety protection device of electronic device touch screen is disposed in the host machine 110. The touch screen 120 has characteristic information (ID, identity) capable of identifying its own identity uniquely, due to the characteristic of its own production processes. Understandably, the touch screen can be one of touch screens with various working principles such as resistance-type touch screen, capacitive touch screen, infrared touch screen, sound wave identification type touch screen or electromagnetic induction type touch screen and so on, and the characteristic information includes absolute value or relative value of one or more parameters of resistance value, capacitance value, inductance value of the touch screen. In this embodiment, the touch screen adopts resistance-type touch screen for example, the characteristic information of the resistance-type touch screen includes absolute value or relative value of one or more parameters of resistance value, capacitance value, inductance value, specifically, can choose the absolute value or relative value of one or more parameters of resistance value, capacitance value, inductance value between certain pair or multi-pair of signal lines, and also can adopt the voltage value of other signal lines under a situation that certain pair or multi-pair of signal lines has been applied power excitation or adopt the current value consumed when the touch screen serves as electrical load, to serve as characteristic information of the touch screen. The present invention utilizes the intrinsic property of above-mentioned characteristic information, by means of detecting the characteristic information of the touch screen 120 in real time and comparing this real-time characteristic information with the standard characteristic information of the touch screen 120 obtained before living the factory and stored in the host machine 110, to verify whether the touch screen is in a factory state, thereby obtaining a conclusion whether the touch screen 120 has been refitted or replaced.

Referring to FIG. 2 to FIG. 6, the specific circuit structure and working principle of the safety protection device of electronic device touch screen of the present invention will be illustrated as follows.

Figure 2:
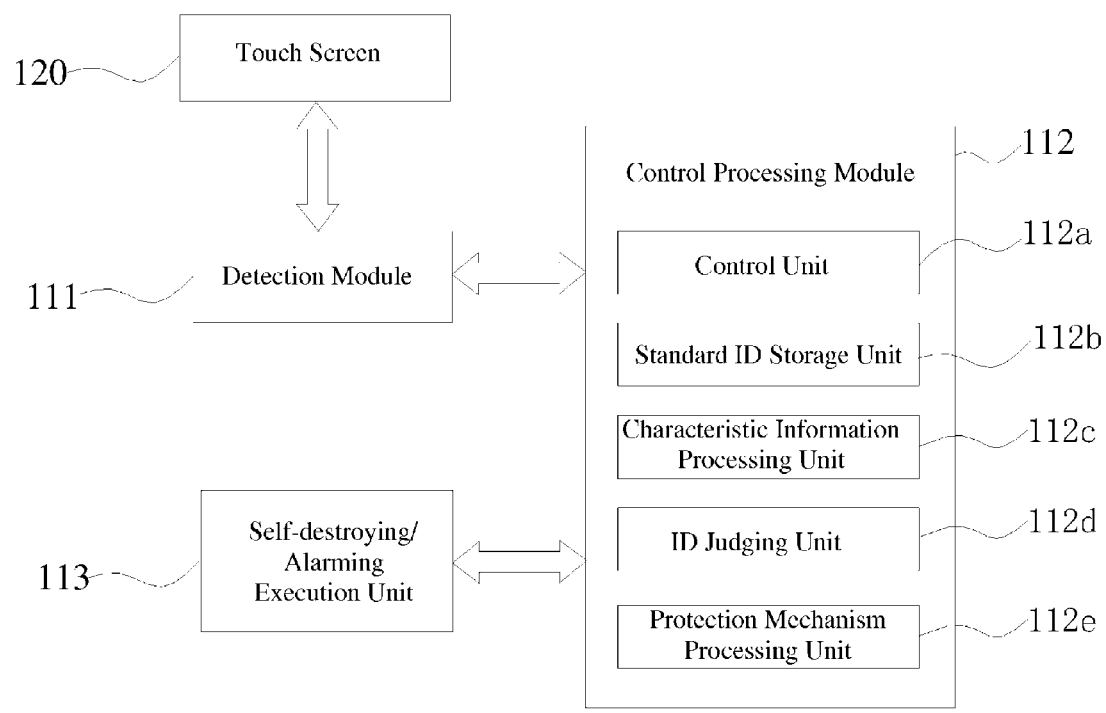
FIG. 2 is a schematic diagram showing a circuit structure of a safety protection device of an electronic device touch screen of the present invention.

Referring to FIG. 2, in this embodiment, the safety protection device of the electronic device touch screen includes a detection module 111, a control processing module 112 and a self-destroying/alarming execution module 113. During the safety protection device of the electronic device touch screen achieving a detection function, the detection module 111 is used for applying excitation signals on one or one set of electrical pins of the touch screen 120 and detecting one or one set of corresponding electrical characteristic value from the one or one set of electrical pins, this or these electrical characteristic values being able to serve as characteristic information (ID) capable of identifying the touch screen uniquely, and the control processing module 112 is used for receiving the characteristic information and judging whether the characteristic information is in consistency with prestored standard characteristic information, controlling the electronic device 100 to work normally if the characteristic information is in consistency with prestored standard characteristic information and controlling the electronic device 100 to stop working and sending trigger signals to the self-destroying/alarming execution module 113 to enable the self-destroying/alarming execution module 113 to carry out corresponding actions of self information destroying/alarming transmission if the characteristic information is not in consistency with prestored standard characteristic information.

Preferably, in this embodiment, the control processing module 112 includes a control unit 112a, a standard ID storage unit 112b, a characteristic information processing unit 112c, an ID judging unit 112d and a protection mechanism processing unit 112e. The control unit 112a is used for controlling the electronic device to work normally or stop working, the standard ID storage unit 112b is used for storing the standard characteristic information which is composed of initial characteristic information of the touch screen 120 so as to identify the touch screen 120 uniquely (it should be noted that the standard ID storage unit 112b had stored the standard characteristic information of the touch screen 120 before the electronic device leaves the factory, and during using the electronic device 100, the authorized operators can reset the standard characteristic information to adjust errors produced by the electronic device 100 due to parameter drift of its touch screen 120 after long-time use), the characteristic information processing unit 112c is used for carrying out an eliminating shake and filtering processing for the read initial characteristic information so as to extract actual characteristic information of the touch screen, the ID judging unit 112d is used for comparing the processed actual characteristic information with the standard characteristic information stored in the ID storage unit 112e, and the protection mechanism processing unit 112e is used for sending trigger signals to the self-destroying/alarming execution module 113.

Figure 3:
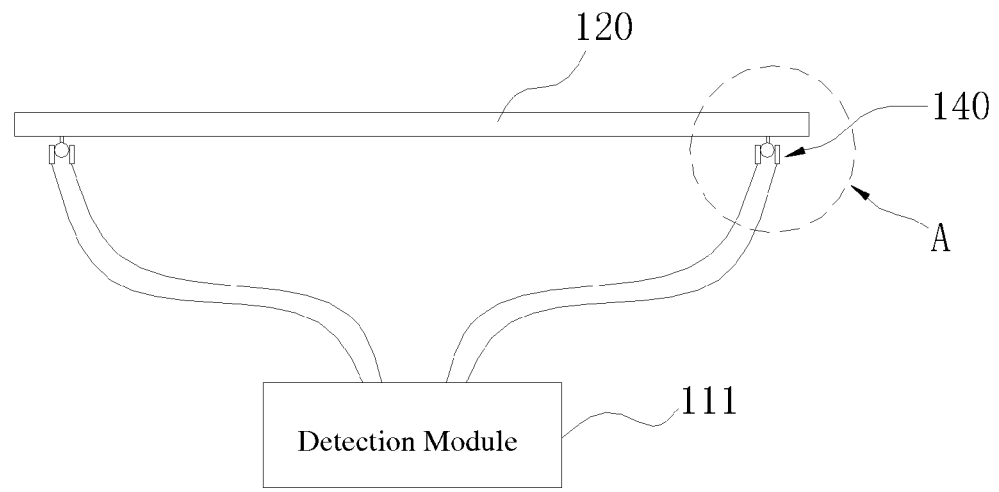
FIG. 3 is a schematic diagram of an anti-removing mechanism of a safety protection device of an electronic device touch screen of the present invention according to an embodiment.
Figure 4:
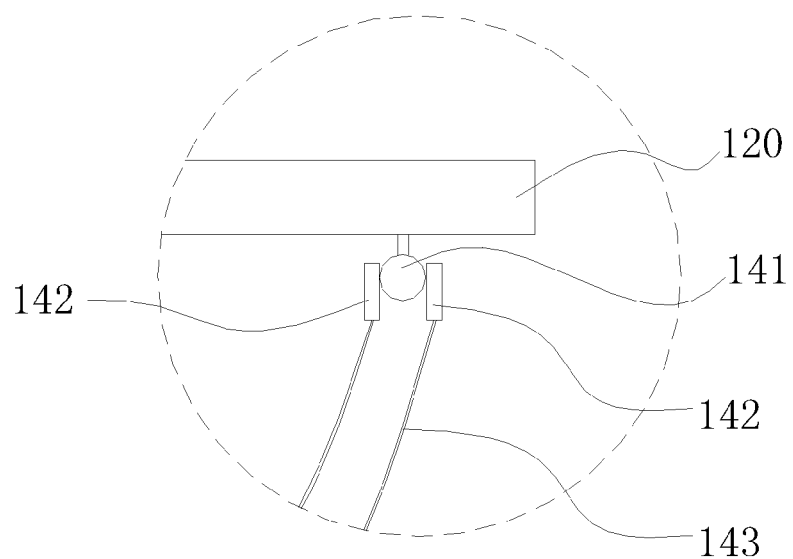
FIG. 4 is an enlarged schematic diagram of the section A shown in FIG. 3.

Referring to FIG. 3 and FIG. 4, in this preferable embodiment, to further prevent the touch screen 120 form being refitted illegally, the touch screen 120 has an anti-removing mechanism arranged thereon, the anti-removing mechanism includes four micro-touch switches connected to the touch screen, and the micro-touch switches are metal dome micro-touch switches, conductive carbon particle micro-touch switches or conductive adhesive micro-touch switches. In this embodiment, the micro-touch switches adopt the metal conductive dome micro-touch switches 140, and the four metal conductive dome micro-touch switches 140 are uniformly distributed around the four corners of the touch screen 120. In this embodiment, each metal conductive dome micro-touch switch 140 includes a metal ball 141 and two metal domes 142, the metal ball 141 is electrically connected to the touch screen 120, the metal domes 142 are electrically connected to the detection module 111 via detecting conductor 143, and the metal ball 141 is separably connected to the metal domes 142 and sandwiched between two metal domes 142. When the touch screen 120 is removed, the metal ball 141 will be separated from the metal domes 142, then, the detection module 111 will detecting the change of signals, and then, by means of the control processing module 112 and the self-destroying/alarming execution module 113 to achieve machine halt and actions of self information destroying/alarming transmission.

Figure 5:
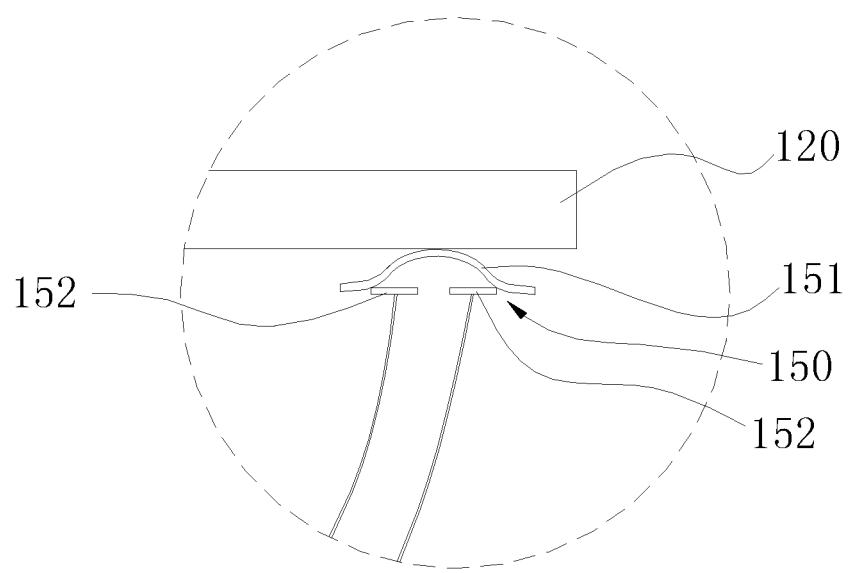
FIG. 5 is a schematic diagram of an anti-removing mechanism of a safety protection device of an electronic device touch screen of the present invention according to another embodiment.

FIG. 5 showing another embodiment of the metal conductive dome micro-touch switch, as shown in FIG. 5, the metal conductive dome micro-touch switch of this embodiment includes metal dome 151 and conductive goldfingers 152, the metal dome 151 is electrically connected to the touch screen, the conductive goldfingers 152 are electrically connected to the detection module 111, and the metal dome 151 is separably connected to the conductive goldfingers 152. Similarly, When the touch screen 120 is removed, the metal dome 151 will be separated from the conductive goldfingers 152, then, the detection module 111 will detecting the change of signals, and then, by means of the control processing module 112 and the self-destroying/alarming execution module 113 to achieve machine halt and actions of self information destroying/alarming transmission.

Figure 6:
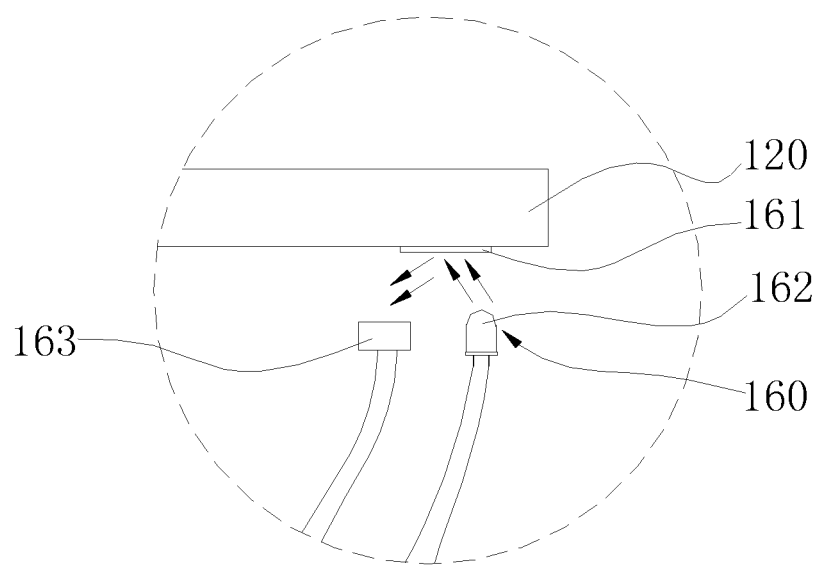
FIG. 6 is a schematic diagram of an anti-removing mechanism of a safety protection device of an electronic device touch screen of the present invention according to another embodiment.

FIG. 6 showing another embodiment of the anti-removing mechanism of the present invention, as shown in FIG. 6, the anti-removing mechanism includes at least one photoelectric detecting switch 160, the photoelectric detecting switch 160 includes a mirror plane 161, a light emitting diode 162 and an optical coupling diode 163, the mirror plane 161 is fixed on the touch screen 120, the light emitting diode 162 and optical coupling diode 163 are electrically connected to the detection module 111. When the touch screen 120 is removed, the detection module 111 will detecting the change of signals, and then, by means of the control processing module 112 and the self-destroying/alarming execution module 113 to achieve machine halt and actions of self information destroying/alarming transmission.

Figure 7:
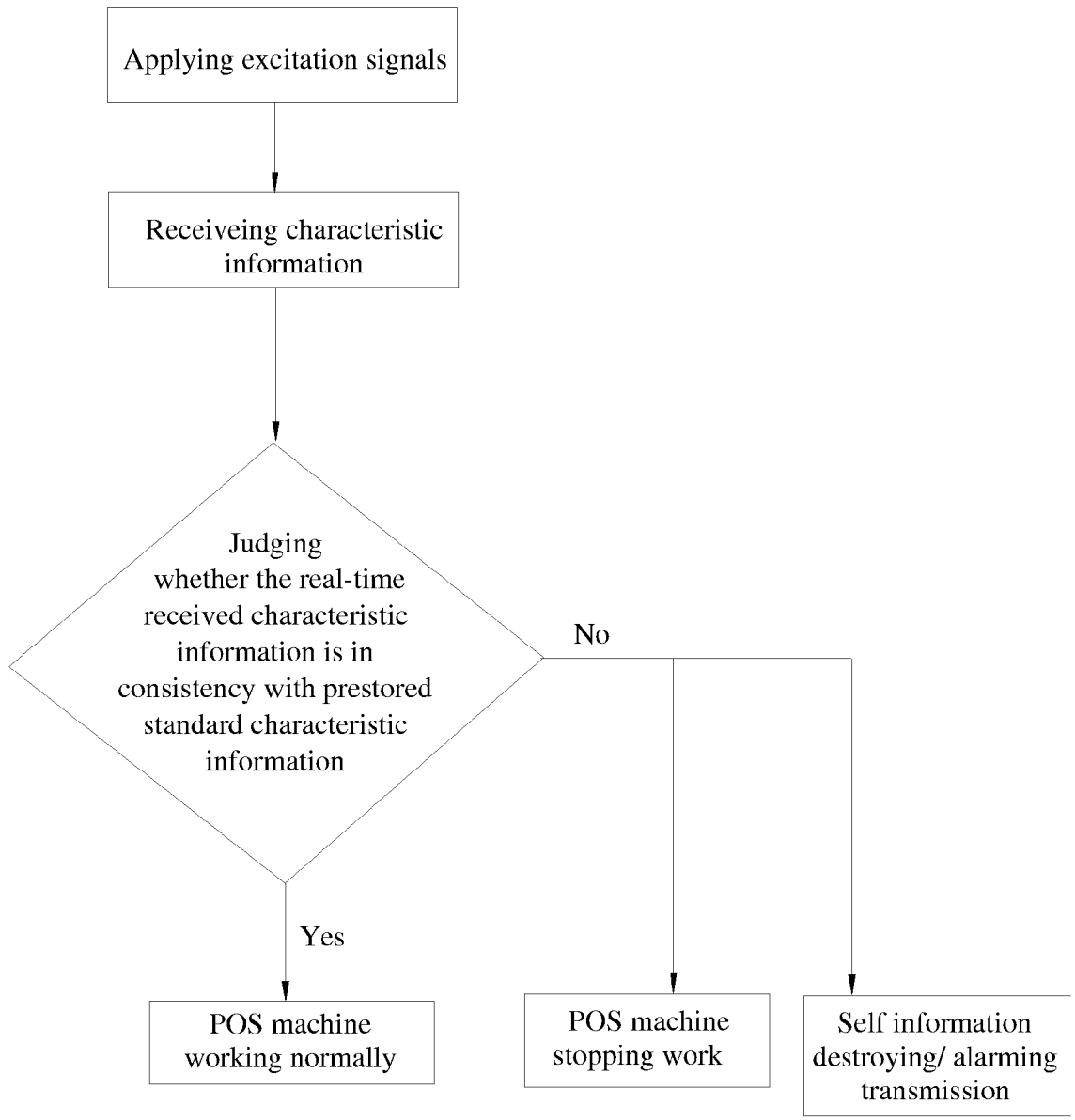
FIG. 7 is a flow schematic diagram of a safety protection method of an electronic device touch screen of the present invention.

Referring to FIG. 7, the present invention simultaneously provides a safety protection method of electronic device touch screen carried out by using the safety protection device of electronic device touch screen, this method including the following steps: adopting the detection module 111 to apply excitation signals on one or one set of electrical pins of the touch screen 120 of the electronic device 100 and detect one or one set of corresponding electrical characteristic value from the one or one set of electrical pins, the one or one set of electrical characteristic value serving as characteristic information (ID) capable of identifying the touch screen uniquely; adopting the control processing module 112 to receive the characteristic information and judge whether the characteristic information is in consistency with prestored standard characteristic information; controlling the electronic device 100 (POS machine) to work normally if the characteristic information is in consistency with prestored standard characteristic information; and controlling the electronic device 100 (POS machine) to stop working and sending trigger signals to the self-destroying/alarming execution module to enable the self-destroying/alarming execution module 113 to carry out actions of self information destroying/alarming transmission if the characteristic information is not in consistency with prestored standard characteristic information.

As described above, the safety protection device of electronic device touch screen of the present invention can detect whether the touch screen of the electronic device has been refitted illegally to threat the sensitive information security of user. This safety protection device of electronic device touch screen utilizes own properties of the electronic device touch screen to judge whether the touch screen has been refitted or replaced, by means of detecting the characteristic information of the touch screen in real time and comparing it with the standard characteristic information of factory setting; if the detected characteristic information is in consistency with prestored standard characteristic information, it means that the touch screen is still the touch screen of factory setting, belongs to normal use range, then the electronic device will be controlled to work normally; if the detected characteristic information is not in consistency with prestored standard characteristic information, it means that the original property of the touch screen has been changed, that is, the touch screen has been refitted or replaced illegally, then the electronic device will be controlled to stop working and produce actions of self information destroying/alarming transmission. As described above, the safety protection device of electronic device touch screen of the present invention, because of being able to detect whether the touch screen of the electronic device has been refitted illegally, can be applied to various electronic devices, which need a safety protection function for sensitive information like password and have a touch screen, to ensure their safety performance.

Understandably, the electronic device in present invention is not limited to be a POS machine, other electronic devices, which need protection function for sensitive information like password, such as self-help terminals of bank, ATM machine and safes, all can use the electronic device provided by the present invention to achieve.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A safety protection device of an electronic device touch screen, used for detecting whether the touch screen of the electronic device has been refitted illegally to threat the sensitive information security of user, comprising a detection module, a control processing module and a self-destroying/alarming execution module, wherein the detection module is used for applying excitation signals on one or one set of electrical pins of the touch screen and detecting one or one set of corresponding electrical characteristic value from the one or one set of electrical pins, the one or one set of electrical characteristic values serving as characteristic information capable of identifying the touch screen uniquely, and the control processing module is used for receiving the characteristic information and judging whether the characteristic information is in consistency with prestored standard characteristic information, controlling the electronic device to work normally if the characteristic information is in consistency with prestored standard characteristic information and controlling the electronic device to stop working and sending trigger signals to the self-destroying/alarming execution module to enable the self-destroying/alarming execution module to carry out actions of self information destroying/alarming transmission if the characteristic information is not in consistency with prestored standard characteristic information;

wherein the control processing module comprises a standard ID storage unit, a control unit, a characteristic information processing unit, an ID judging unit and a protection mechanism processing unit; the standard ID storage unit is used for storing the standard characteristic information which is composed of initial characteristic information of the touch screen and capable of identifying the touch screen uniquely, the control unit is used for controlling the electronic device to work normally or stop working, the characteristic information processing unit is used for carrying out an eliminating shake and filtering processing for the read initial characteristic information so as to extract actual characteristic information of the touch screen, the ID judging unit is used for comparing the characteristic information with the standard characteristic information stored in the ID storage unit, and the protection mechanism processing unit is used for sending trigger signals to the self-destroying/alarming execution module.

2. The safety protection device of an electronic device touch screen according to claim 1, wherein the touch screen is resistance-type touch screen, capacitive touch screen, infrared touch screen, sound wave identification type touch screen or electromagnetic induction type touch screen; and the characteristic information comprises absolute value or relative value of one or more parameters of resistance value, capacitance value, inductance value of the touch screen.

3. The safety protection device of an electronic device touch screen according to claim 1, wherein further comprises an anti-removing mechanism, the anti-removing mechanism comprises at least one micro-touch switch connected to the touch screen, and the micro-touch switch is metal dome micro-touch switch, conductive carbon particle micro-touch switch or conductive adhesive micro-touch switch.

4. The safety protection device of an electronic device touch screen according to claim 3, wherein the metal conductive dome micro-touch switch comprises a metal ball electrically connected to the touch screen and two metal domes electrically connected to the detection module, and the metal ball is arranged between the two metal domes and separably connected to the metal domes.

5. The safety protection device of an electronic device touch screen according to claim 3, wherein the metal conductive dome micro-touch switch comprises a metal dome electrically connected to the touch screen and conductive gold-fingers electrically connected to the detection module, and the metal dome is separably connected to the conductive gold-fingers.

6. The safety protection device of an electronic device touch screen according to claim 1, wherein further comprises an anti-removing mechanism, the anti-removing mechanism comprises at least one photoelectric detecting switch, and the photoelectric detecting switch comprises a mirror plane fixed on the touch screen, a light emitting diode and an optical coupling diode, both of which are electrically connected to the detection module.

7. The safety protection device of an electronic device touch screen according to claim 1, wherein the electronic device, to which the safety protection device applies, comprises POS machine, ATM machine or safe.

8. A safety protection method of an electronic device touch screen, used for detecting whether the touch screen of the electronic device has been refitted illegally to threat the password security of user, comprising the following steps:
    adopting a detection module to apply excitation signals on one or one set of electrical pins of the touch screen and detect one or one set of corresponding electrical characteristic value from the one or one set of electrical pins, the one or one set of electrical characteristic value serving as characteristic information (ID) capable of identifying the touch screen uniquely;
    adopting a control processing module to receive the characteristic information and judge whether the characteristic information is in consistency with prestored standard characteristic information;
    controlling the electronic device to work normally if the characteristic information is in consistency with prestored standard characteristic information and controlling the electronic device to stop working and sending trigger signals to the self-destroying/alarming execution module to enable the self-destroying/alarming execution module to carry out actions of self information destroying/alarming transmission if the characteristic information is not in consistency with prestored standard characteristic information;
    wherein the step of controlling the electronic device comprises:
    storing the standard characteristic information which is composed of initial characteristic information of the touch screen and capable of identifying the touch screen uniquely,
    controlling the electronic device to work normally or stop working,
    carrying out an eliminating shake and filtering processing for the read initial characteristic information so as to extract actual characteristic information of the touch screen,
    comparing the characteristic information with the stored standard characteristic information, and
    sending trigger signals to the self-destroying/alarming execution module.

9. The safety protection method of an electronic device touch screen according to claim 8, wherein the touch screen is resistance-type touch screen, capacitive touch screen, infrared touch screen, sound wave identification type touch screen or electromagnetic induction type touch screen; and the characteristic information comprises absolute value or relative value of one or more parameters of resistance value, capacitance value, inductance value of the touch screen.

* * * * *